(12) United States Patent
Marron et al.

(10) Patent No.: US 6,882,433 B2
(45) Date of Patent: Apr. 19, 2005

(54) INTERFEROMETER SYSTEM OF COMPACT CONFIGURATION

(75) Inventors: Joseph C. Marron, Ann Harbor, MI (US); Dean Faklis, Bloomfield, NY (US)

(73) Assignee: Lightgage, Inc., Bloomfield, NY (US)

( * ) Notice: Subject to any disclaimer, the term of this patent is extended or adjusted under 35 U.S.C. 154(b) by 0 days.

(21) Appl. No.: 10/610,236

(22) Filed: Jun. 30, 2003

(65) Prior Publication Data

US 2004/0075843 A1 Apr. 22, 2004

Related U.S. Application Data

(60) Provisional application No. 60/392,962, filed on Jul. 1, 2002.

(51) Int. Cl.[7] ................................................ G02B 9/02
(52) U.S. Cl. ...................................... 356/512; 356/477
(58) Field of Search ................................ 356/477, 512, 356/489, 495, 511

(56) References Cited

U.S. PATENT DOCUMENTS

| 4,832,489 A | | 5/1989 | Wyant et al. ................ 356/359 |
| 5,319,668 A | | 6/1994 | Luecke ......................... 372/107 |
| 5,418,612 A | * | 5/1995 | Khopov ........................ 356/512 |
| 5,467,184 A | * | 11/1995 | Tenjimbayashi ............ 356/35.5 |
| 5,627,363 A | | 5/1997 | Paxman et al. ........... 350/208.1 |
| 5,666,195 A | * | 9/1997 | Shultz et al. ................ 356/519 |
| 5,777,742 A | * | 7/1998 | Marron ........................ 356/458 |
| 5,802,085 A | | 9/1998 | Lefevre et al. ................ 372/20 |
| 5,867,512 A | | 2/1999 | Sacher .......................... 372/20 |
| 5,880,841 A | | 3/1999 | Marron et al. ............... 356/360 |
| 5,907,404 A | * | 5/1999 | Marron et al. ............... 356/489 |
| 5,909,282 A | | 6/1999 | Kulawiec ..................... 356/355 |
| 5,926,277 A | | 7/1999 | Marron et al. ............... 356/360 |
| 6,018,535 A | | 1/2000 | Maeda .......................... 372/20 |
| 6,026,100 A | | 2/2000 | Maeda .......................... 372/20 |
| 6,359,692 B1 | | 3/2002 | Groot ........................... 356/512 |
| 2002/0109851 A1 | | 8/2002 | Deck ............................ 356/512 |
| 2004/0075844 A1 | * | 4/2004 | Marron et al. ............... 356/514 |

OTHER PUBLICATIONS

Finchman and Freeman "The Action of Filters" from Optics. 1980: Butterworth, 9th Edition. pp. 195–196..*
"Multiple–wavelength Interferometry With Tunable Source", R.G. Pilston and G.N. Steinberg, Applied Optics, vol. 8, No. 3, Mar. 1969, pp. 552–556.
"Two–wavelength Interferometry", D. Malacara, editor, Optical Shop Testing, New York, Wiley, 1978, pp. 397–402.
"Multiple–wavelength Phase–shifting Interferometry", Y. Cheng and J.C. Wyant, Applied Optics, vol. 24, No. 6, Mar. 15, 1985, pp. 804–806.

(Continued)

Primary Examiner—Gregory J. Toatler, Jr.
Assistant Examiner—Patrick Connolly
(74) Attorney, Agent, or Firm—Thomas B. Ryan, Esq.; Brian B. Shaw, Esq.; Harter, Secrest & Emery LLP.

(57) ABSTRACT

An expanding measuring beam is inserted into a cavity of a frequency-scanning interferometer. The expanding measuring beam encounters non-specular (diffuse) reference and object surfaces so that the reflected light can be imaged with an imaging system of reduced dimension. The compact interferometer is adaptable to a variety of applications. For example, the compact interferometer can be incorporated into a sensor of a multi-stage measuring instrument or into a handheld imager.

22 Claims, 6 Drawing Sheets

OTHER PUBLICATIONS

"Distance measurement by the wavelength shift of laser diode light", H. Kikuta, K. Iwata, and R. Nagata, Applied Optics, vol. 25, No. 17, Sep. 1, 1986, pp. 2976–2980.

"Interferometer for measuring displacement and distance", T. Kubota, M. Nara, and T. Yoshino, Optics Letters, vol. 12, No. 5, May 1987, pp. 310–312.

"Three–color laser–diode interferometer", P. de Groot, Applied Optics, vol. 30, No. 25, Sep. 1, 1991, pp. 3612–3616.

"Wavelength–shift interferometry for distance measurements using the Fourier transform technique for fringe analysis", M. Suematsu and M. Takeda, Applied Optics, vol. 30, No. 28, Oct. 1, 1991, pp. 4046–4055.

"Three–dimensional lenseless imaging using laser frequency diversity", J.C. Marron and K.S. Schroeder, Applied Optics, vol. 31, No. 2, Jan. 10, 1992, pp. 255–262.

"Holographic laser radar", J.C. Marron and K.S. Schroeder, Optics Letters, vol. 18, No. 5, Mar. 1, 1993, pp. 385–387.

"Use of a opacity constraint in three–dimensional imaging", R.G Paxman, J.H. Seldin, J.R. Fienup, and J.C. Marron, in proceedings of the SPIE Coference on Inverse Optics III, Orlando, Florida, Apr. 1994.

"Applications of Tuneable Lasers to Laser Radar and 3D Imaging", L.G. Shirley and G.R. Hallerman, Technical Report 1025, Lincoln Laboratory, MIT, Lexington, Massachusetts, Feb. 26, 1996.

"Wavelength scanning profilometry for real–time surface shape measurement", S. Kuwamura and I. Yamaguchi, Applied Optics. vol. 36, No. 19, Jul. 1, 1997, pp. 4473–4482.

"Three–dimensional imaging using a tunable laser source", J.C. Marron and K.W. Gleichman, Optical Engineering 39(1) 47–51, Jan. 2002, pp. 47–51.

"Spectrally narrow pulsed dye laser without beam expander", M.G. Littman and H.J. Metcalf, Applied Optics. vol. 17, No. 14, Jul. 15, 1978, pp. 2224–2227.

"A simple extended–cavity diode laser", A.S. Arnold, J.S. Wilson, and M.G. Boshier, Review of Scientific Instruments, vol. 69, No. 3, Mar. 1998, pp. 1236–1239.

"External–cavity diode laser using a grazing–incidence diffraction grating", K.C. Harvey and C.J. Myatt, Optics Letters, vol. 16, No. 12, Jun. 15, 1991, pp. 910–912.

"Novel geometry for single–mode scanning of tuneable lasers", K Liu and M.G. Littman, Optics Letters, vol. 6, No. 3, Mar. 1981, pp. 117–118.

"External–cavity frequency–stabilization of visible and infared semiconductor lasers for high resolution spectroscopy", M.G. Boshier, D. Berkeland, E.A. Hinds, and V. Sandoghar, Optics Communications 85, Sep. 15, 1991, pp. 355–359.

"Widely Tunable External Cavity Diode Lasers", T. Day, M. Brownell, and I–Fan Wu, New Focus, Inc., 1275 Reamwood Avenue, Sunnydale, California.

"Littrow configuration tunable external cavity diode laser with fixed direction output beam", C.J. Hawthorn, K.P. Weber and R.E. Scholten, Review of Scientific Instruments, vol. 72, No. 12, Dec. 2001, pp. 4477–4479.

"Fizeau Interferometer", D. Malacara, editor, *Optical Shop Testing*, New York, Wiley, 1978, pp. 19–24.

"Burch's Interferometer Employing Two Matched Scatter Plates", D. Malacara, editor, *Optical Shop Testing*, New York, Wiley, 1978, pp. 82–84.

"Holographic contouring by using tunable lasers", N. George and W. Li, Optics Letters, vol. 19, No. 22, Nov. 15, 1994, pp. 1879–1881.

"Use of a multimode short–external–cavity laser diode for absolute–distance intereometry", P. de Groot, Applied Optics, vol. 32, No. 22, Aug. 1, 1993, pp. 4193–4198.

"Three–dimensional sensing of rough surfaces by coherence radar", T. Dresel, G. Hausler, and H. Venzke, Applied Optics, vol. 31, No. 7, Mar. 1, 1992, pp. 919–925.

Littrow–Laser web site sacher.de/littrow.htm, Apr. 7, 2002.

"Tunable Diode Lasers—Stand up to Research and Commercial Applications", B. Shine, Laser Product Line Manager, New Focus, Inc., originally published in Photonics Spectra, Jan. 1992, pp. 102.

"Scatter Fringes of Equal Thickness", J.M. Burch, Nature, vol. 17, May 16, 1953, pp. 889–890.

"Scatter–Fringe Interferometry", J.M. Burch, J. Opt. Soc. Am. 52, 1962, p. 600.

"Some Further Aspects of Scatter–Fringe Interferometry", A.H. Shoemaker and M.V.R.K Murty, Applied Optics, vol. 5, No. 4, Apr. 1966, pp. 603–607.

"Laser Speckle and Related Phenomena", J.C. Dainty, editor, Springer–Verlag, Berlin, 1984.

"Digital Picture Processing", A. Rosenfield, and A.C. Kak, vol. 1,. Academic Press. New York. 1982.

* cited by examiner

INTERFEROMETER SYSTEM OF COMPACT CONFIGURATION

RELATED APPLICATIONS

This application claims the benefit of prior filed U.S. Provisional Application No. 60/392,962, filed 1 Jul. 2002, which is hereby incorporated by reference.

TECHNICAL FIELD

The invention relates to the configuration of interferometric measuring systems, especially frequency-scanning interferometers, and particularly to compact and portable configurations.

BACKGROUND

There is significant need for compact 3-D measurement systems for precision measurement of manufactured parts. A common method is to use a Coordinate Measurement Machine (CMM). CMM's use a mechanical stylus that measures a part's shape by touching it at multiple points and assembling the coordinates of the touch points to form a 3-D representation. CMM's are typically slow because of their mechanical nature. Interferometric measurement systems have also been proposed. However, such 3-D interferometric measurement systems that are commercially available today, are generally large, expensive, and have difficulty measuring parts with a wide variety of surface reflectivities.

It is a feature of the invention to provide a compactly configured interferometric measurement system which has the advantages of being non-contacting and capable of measuring parts at higher temporal and spatial rates than conventional CMM's.

It is another feature of the invention to provide an interferometric measurement system compact enough so that its 3-D interferometric sensor can be mounted on the measurement arm of a CMM, in order to take advantage of the excellent positioning capability of a CMM while using the precision and speed of non-contact interferometric methods. The measurement system is compatible with restrictions on the size and weight of objects that can be mounted on CMM arms. A further feature of the compact interferometric measurement system of the invention is that the sensor thereof can be generally of lower cost and simpler to logistically support than is the case with larger interferometric measurement equipment heretofore available.

A further feature of the invention is to provide an interferometric measurement system having compact, lightweight interferometric sensors.

It is a still further feature of the invention to reduce the size of an interferometric measurement system and make significantly compact for portability, an interferometric 3-D interferometric measurement system using advanced components such as high-density CCD detector arrays and tunable diode lasers that provide multiple laser wavelengths as the basis for measurement.

Typically, a frequency-scanning interferometer includes a tunable laser that is stepped through a series of frequencies (wavelengths), and the interference of a reference beam and object beam is recorded for each wavelength using a 2-D detector array. Subsequent Fourier processing of the interference data yields a 3-D image of the object.

A known frequency-scanning interferometer system 10 is depicted in FIG. 1. While in the overall form of a Twyman-Green interferometer, a tunable laser 12 under the control of a computer 14 produces a measuring beam 16 that can be tuned through a range of different frequencies. An illuminating system including beam conditioning optics 18 expand and collimate the measuring beam 16. A folding mirror 20 directs the measuring beam 16 to a beamsplitter 22 that divides the measuring beam 16 into a object beam 24 and a reference beam 26. The object beam 24 retroreflects from a test object 30, and the reference beam 26 retroreflects from a reference mirror 32. The beamsplitter 22 recombines the object beam 24 and the reference beam 26, and imaging optics 34 (such as a lens or group of lenses) of an imaging system focus overlapping images of the test object 30 and the reference mirror 32 onto a detector array 36 (such as a CCD array of elements). The detector array 36 records the interferometric values of an interference pattern produced by path length variations between the object and reference beams 24 and 26. Outputs from the detector array 36 are stored and processed in the computer 14.

The elements (pixels) of the detector array 36 record local interferometric values subject to the interference between the object and reference beams 24 and 26. Each of the interferometric values is traceable to a spot on the test object 30. However, instead of comparing interferometric values between the array elements (pixels) to determine phase differences between the object and reference beams 24 and 26 throughout an interference pattern as a primary measure of surface variation, a set of additional interference patterns is recorded for a series of different beam frequencies (or wavelengths) of the measuring beam 16. The tunable laser 12 is stepped through a succession of incrementally varying beam frequencies, and the detector array 36 records the corresponding interference patterns. Data frames recording individual interference patterns numbering 16 or 32 frames are typical.

The local interferometric values vary in a sinusoidal manner with the changes in beam frequency, cycling between conditions of constructive and destructive interference. The rate of interferometric variation, e.g., the frequency of intensity variation, is a function of the path length differences between the local portions of the object and reference beams 24 and 26. Gradual changes in intensity (lower interference frequency variation) occur at small path length differences, and more rapid changes in intensity (higher interference frequency variation) occur at large path length differences.

Discrete Fourier transforms can be used within the computer 14 to identify the interference frequencies of interferometric (e.g., intensity) variation accompanying the incremental changes in the beam frequency of the measuring beam 16. The computer 14 also converts the interference frequencies of interferometric variation into measures of local path length differences between the object and reference beams 24 and 26, which can be used to construct a three-dimensional image of the test object 30 as measures of profile differences from a surface of the reference mirror 32. Since the reference mirror 32 is planar, the determined optical path differences are equivalent to deviations of the object 30 from a plane. The resulting three-dimensional topographical information can be further processed to measure important characteristics of the object 30 (e.g. flatness or parallelism), which are useful for quality control of precision manufactured parts.

Enhancements to the instrument design and processing used in frequency-scanning interferometry are described in U.S. Nonprovisional application Ser. No. 10/610,235, filed 30 Jun. 2003, under the title FREQUENCY-SCANNING INTERFEROMETER WITH NON-SPECULAR REFERENCE SURFACE, based on U.S. Provisional Application No. 60/392,810, filed 1 Jul. 2002, which are both hereby incorporated by reference. The invention described by the concurrently filed application simplifies the design of multi-wavelength interferometers by eliminating the need for collimating optics among other improvements and thus enabling compact, lightweight and inexpensive systems.

SUMMARY OF INVENTION

A more compact configuration provided by this invention improves interferometric configurations containing diffusely reflective (non-specular) reference surfaces. This invention further exploits associated design opportunities for frequency-scanning interferometer configurations by reducing the number of interferometric components and by and more efficiently arranging the reduced number of components in more compact and useful configurations.

Briefly described, an interferometer system embodying the invention has a source of illumination, preferably from a tunable laser source, which steps through N laser frequencies (wavelengths). This illumination is inserted into the path of return illumination from the object and reference surfaces, which are imaged onto a detector as a succession of different-frequency interference patterns. The illumination is inserted in its return path just ahead of the imaging optics so that both the illuminating system and the imaging system of the interferometer share overlapping pathways. A fiber optic extension of the source located slightly offset from an optical axis of the return path or a directional element located along the return path and in communication with the source can be used to insert the illumination. Both examples result in a more compact configuration.

A computer system, which controls the source of illumination, receives interference data from the detector onto which the interference patterns are imaged. The computer system can be remote and coupled by wireless link to both the source and the detector. This configuration is well adapted for portable operation, such as in a handheld housing, or installation on a manipulator, such as a CCM arm.

It is the diffuse character of both the object surface and the reference surface that permits the illumination to be inserted in the form of an expanding beam. This alone obviates requirements for collimating optics. The returning portions of the object and reference beams are also non-collimated and more diffuse (less spatially coherent). Randomly oriented rays from object points on the object and reference surface fill the aperture of the imaging system before being brought to focus at corresponding image points on the detector. Even with a directional optic obscuring a portion of the imaging system aperture, object points near the optical axis can still be imaged by rays sufficiently inclined to the optical axis.

By way of example, a compactly configured interferometer system arranged in accordance with the invention includes a detector that is illuminated by return illumination traveling along a return path from an object surface and from a non-specular reference surface. A source of illumination provides an object beam and a reference beam that are incident on the object and reference surface, respectively. A beam insertion system directs an expanding beam of illumination from the source along the return path in a direction opposite to the return illumination.

The beam insertion system can include a fiber optic having an end from which illumination from the source emanates or a mirror located along the return path directing the expanding beam of illumination to the object and reference surfaces. In combination with the mirror, the beam insertion system can also include an objective that directs the illumination from the source to the mirror.

An interferometer system for measuring the profile of an object surface arranged in accordance with an embodiment of the invention includes a source for providing an illumination beam along a first path. A reference member is arranged to have a diffuse reflective surface. Beam directional optics (a) split the illumination beam into an object beam to illuminate the object surface and a reference beam to illuminate the diffuse reflective surface, and (b) combine returned light from the illuminated object surface and the illuminated diffuse reflective surface along a second path to form interference patterns representing differences between the object surface and the diffuse reflective surface. Imaging optics focus the interference patterns onto a detector in the form of overlapping images of the object surface and the diffuse reflective surface. The first and second paths overlap and the illumination beam travels along the first path in a direction opposite to the returned light along the second path.

Preferably the interferometer system further comprises a housing that contains the reference member, the beam directional optics, and the imaging optics, and that includes a window through which passes the object beam to the object surface and the returned light from the object surface. The preferred housing is capable of being handheld or installed as a movable sensor on a coordinate measuring machine.

DRAWINGS

DETAILED DESCRIPTION

Figure 3:
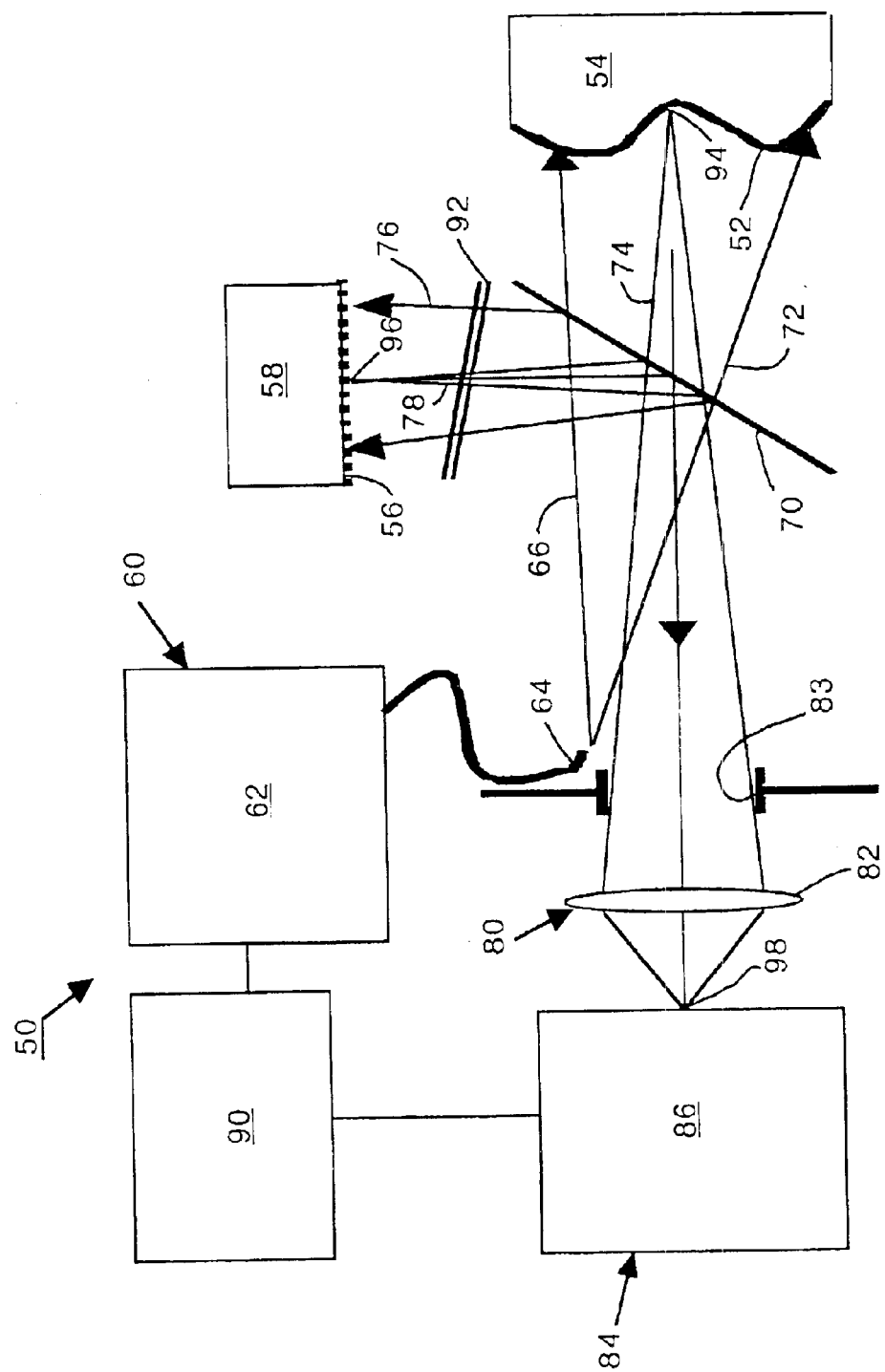
FIG. 3 is a block diagram illustrating a compact interferometer system embodying the present invention.

A frequency-scanning interferometer system 50 shown in FIG. 3. is configured without special beam conditioning optics for expanding and collimating a measuring beam 66. A computer system 90 controls the output frequency of an electronically controlled tunable laser 62 of an illumination system 60. The control communication and all coupling to the computer 90 can be via wireless links to enhance portability, such as IR or RF interfaces, or less preferably such communication and coupling can be by cables or wires. The term "computer" herein refers to a computer system having peripheral devices such as display, printer, mouse, keyboard, and the like, or other control computer of a typical interferometer system. The tunable laser 62 is typically a tunable diode laser operating in the visible or near-infrared region (600 to 900 nanometers) where available detector arrays have high sensitivity. Such lasers are typically tunable over a 20-nanometer range. A frequency-tunable laser preferred for the practice of this invention is disclosed in co-pending U.S. application Ser. No. 10/446,012, filed 27 May 2003, entitled TUNABLE LASER SYSTEM HAVING AN ADJUSTABLE EXTERNAL CAVITY, which is hereby incorporated by reference.

The immediate output from the laser 62 is directed through a fiber optic element 64 to form a point source. The measuring beam 64 emanating from the end of the fiber element 64 passes through a beamsplitter 70 that splits the beam into an object beam 72 that illuminates an object surface 52 of a test object 52 and a reference beam 76 that illuminates a non-specular (diffuse) reference surface 56 of a reference element 58.

The reference surface 56 is preferably nominally flat. However, curved surfaces can be used to compensate for curvature bias in the scaling of path length difference measurements between the object and reference beams 72 and 76. The scattering depth of the non-specular reference surface 56 is desirably small compared to the range measurements (e.g., $1/10^{th}$ the maximum anticipated range measurement). The non-specular reference surface 56 can for example be constructed by applying a diffuse coating to the surface of a mirror. Other techniques to provide a diffuse surface or layer upon a reflective surface include: depositing microscopic particles onto a surface, sand blasting or otherwise abrading a metal or other reflective surface, or by applying a scattering transmissive element (such optically diffuse cellophane tape) to a reflective surface.

A neutral density filter 92 attenuates light illuminating and scattered from the reference surface 56 so that the strength of the return from the reference surface roughly matches the return from the object surface 52. A scattered portion 74 of the object beam 72 from the object surface 52 is then combined with a scattered portion 78 of the reference beam 76 from the reference surface 56 by the beamsplitter 70 and redirected toward an imaging system 80.

A lens, or lens system, 82 together with an aperture stop 83 of the imaging system 80 forms overlapping images of the object and reference surfaces 52 and 56 onto a detector array 86 from the combined return illumination 74 and 78. The overlapping images form an interference pattern. However, the path length variations between the returning object beam portion 64 and the returning reference beam portion 78 can readily exceed the fringe spacing between adjacent cycles of constructive and destructive interference so that the interference patterns can appear as speckle patterns without discernable fringes. The portion of the interferometer where the illumination interferes can be called the "cavity".

The illustrated rays of the return illumination 74 and 78 depict the operation of the imaging system 80 for exemplary object points 94 and 96. As shown, the rays depict a range of angular dispersion from the object points 94 and 96 that can be imaged by the imaging optics 80 to a corresponding image point 98. Larger angular departures are blocked by the aperture stop 83. The overlapping images formed by the imaging system 80 are conjugate to the object surface 52 and the reference surface 56 so that the optical path lengths between the object points 94 and 96 and their corresponding image point 98 are not affected by the angular departure of rays from the object points 94 and 96.

The neutral density filter 92 is present to adjust the intensity so as to maximize interference contrast. The filter 92 is inclined with respect to the reference surface 56 so that back reflections are reduced. Apodization filters can also be used to balance intensity throughout the aperture of the imaging system 80 so that variation in illumination is best matched to the optimum range of the detector array 86.

Figure 1:
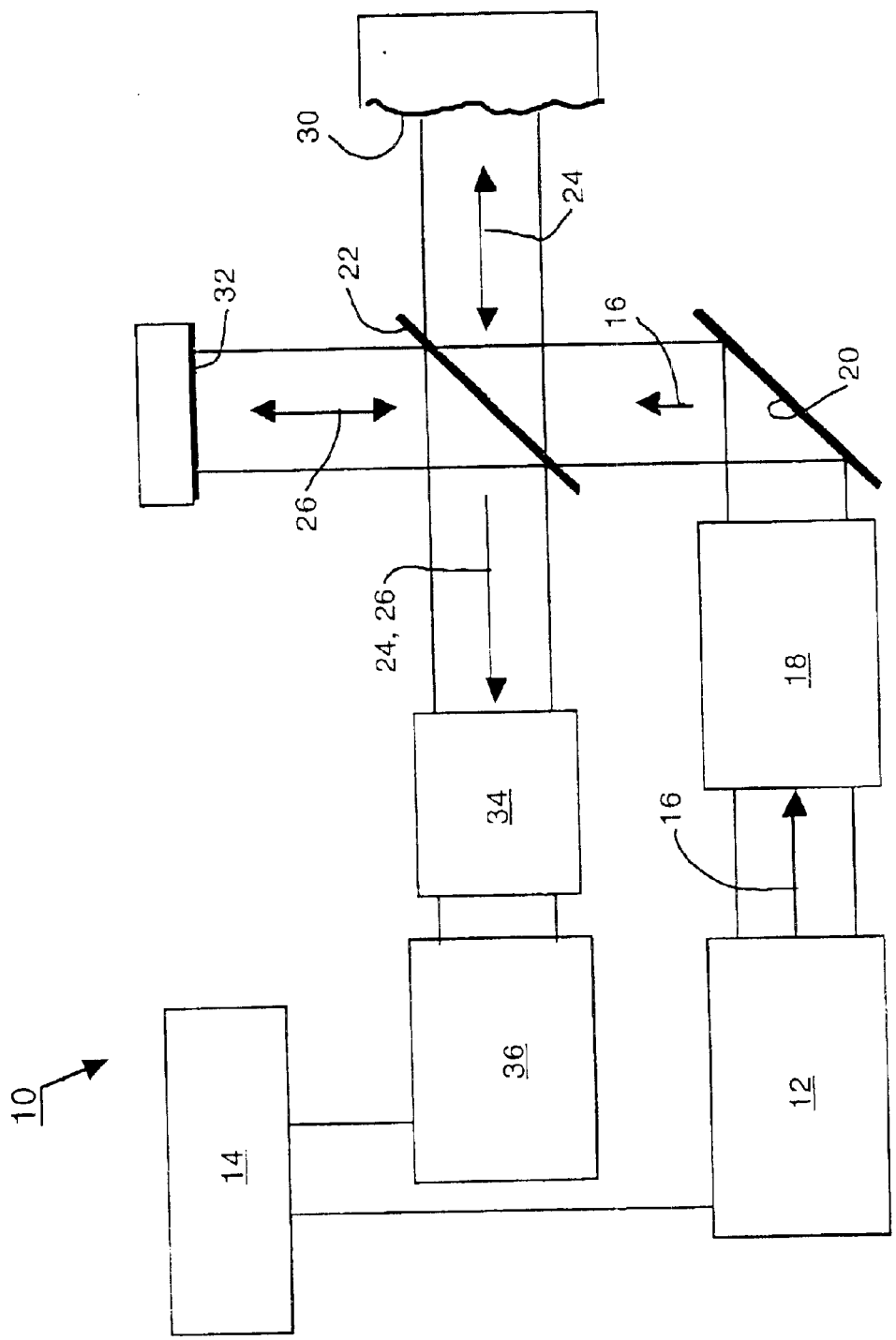
FIG. 1 is a block diagram illustrating a frequency-scanning interferometer according to the prior art.
Figure 2:
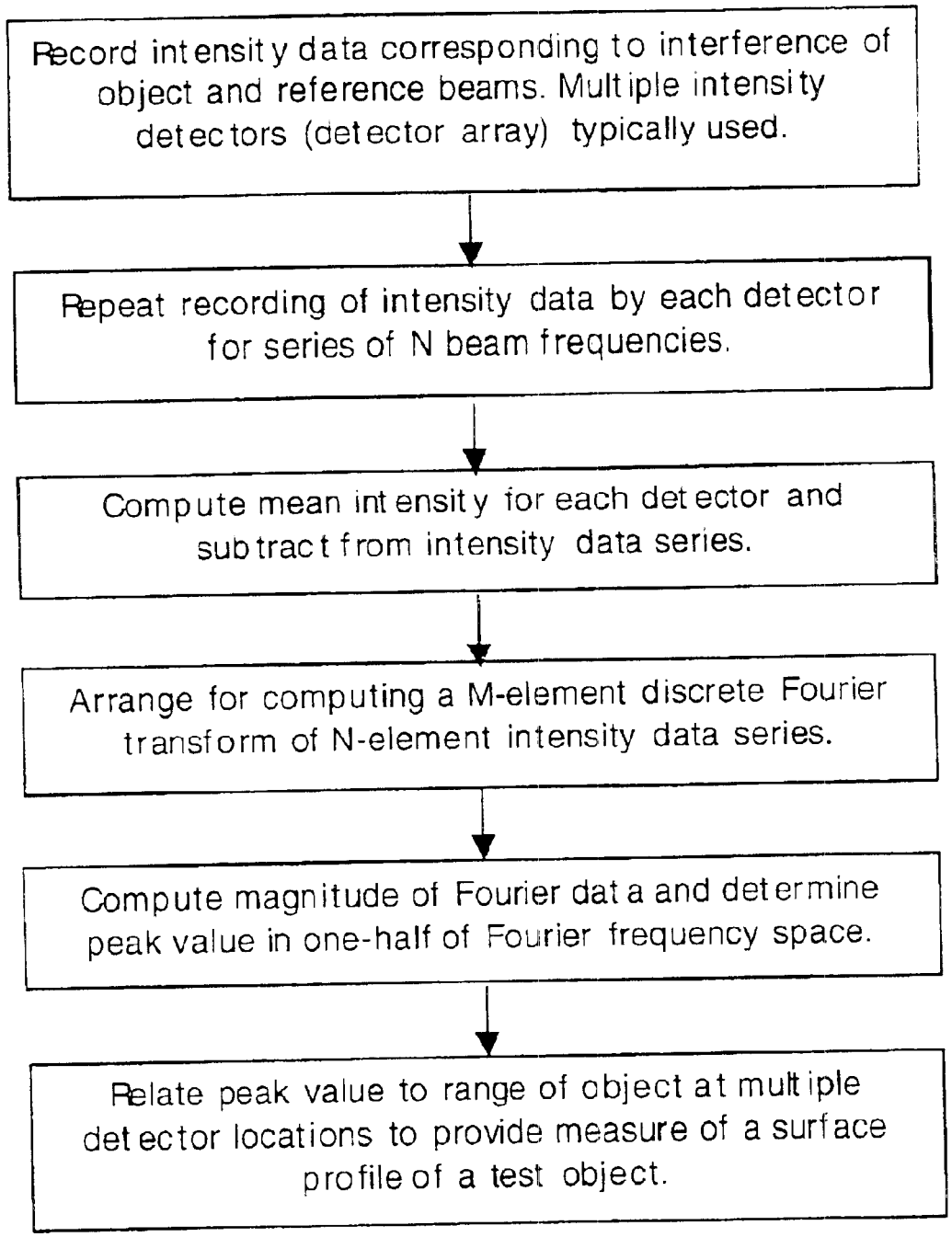
FIG. 2 is a flow chart indicating suitable programming of the control computer shown in FIGS. 1, 3 and 4.

The detector array 86 is operated as a part of a data acquisition system 84 associated with the computer system 90 for converting interferometric data into range or height information about the object surface 52. Preferably, computer system 90 constructs a 3-D image of the object surface 52. A computer program, which carries out the processing algorithm as shown in FIG. 2, can be augmented by a distortion correction step that applies a field-dependent scale factor to compensate for geometrical distortion that results when diverging illumination is used. Additional details of the computer program and method of processing interferometric data from frequency-scanning interferometers are described in co-pending U.S. patent application Ser. No. 10/601,802, filed 23 Jun. 2003, now U.S. Pat. No. 6,741,361, entitled MULTI-STAGE DATA PROCESSING FOR FREQUENCY-SCANNING INTERFEROMETER based on U.S. Provisional Application No. 60/391,004, filed 24 Jun. 2002, which are both hereby incorporated by reference.

The lens system 82 has the aperture stop 83 in front thereof, as would be the case if a design similar to a telescope eyepiece (aperture stop 83 corresponding to the eye pupil) were used; however, different lens systems with interior stops or zoom magnification can readily be used. A key advantage of the system 50 shown in FIG. 3 is that a compact system with non-obstructing delivery of the illumination is obtained using a fiber optic element 64 which directs the illumination along an overlapping path as the returning illumination 74, 78 but in a direction opposite thereto. It is the diverging form of the measuring beam 64 together with the non-specular (diffuse) character of the object and reference surfaces 54 and 58 that fills the aperture 83 of the imaging system 80 with light emanating from the fiber optic 64 located offset from the imaging system aperture 83.

Figure 4:
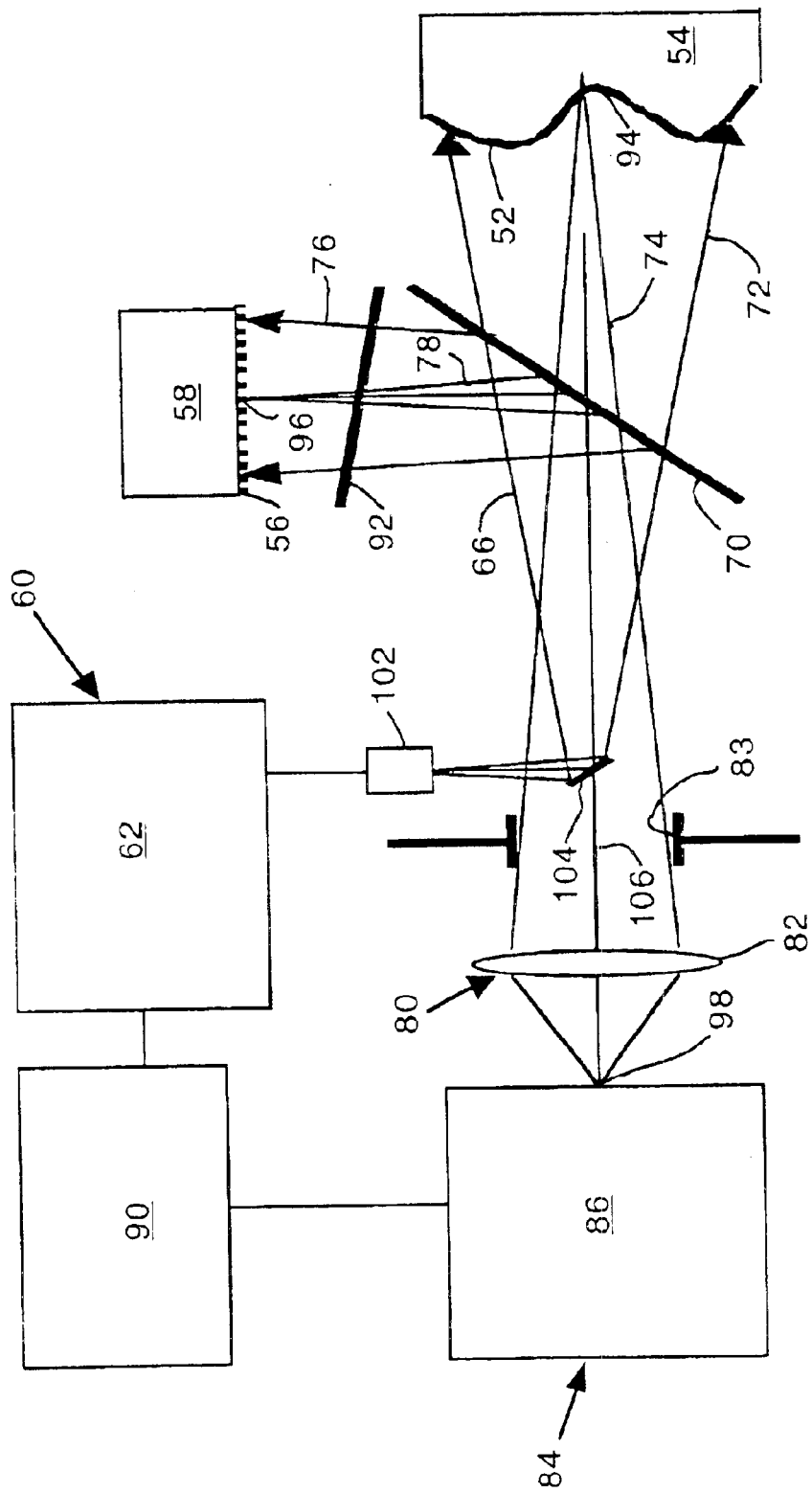
FIG. 4 is a block diagram illustrating another compact interferometer system according to the invention.

Another frequency-scanning interferometer embodiment of the invention is illustrated in FIG. 4. Here a frequency-scanning interferometric system 100 contains a number of components in common with the just-described interferometer system 50, and these components referred to by the same reference numerals. However, a microscope objective 102 together with a directional optic 104 in the form of an obscuring mirror is used to deliver the laser illumination into the interferometer cavity in a direction opposite to the return illumination 74 and 78. The directional optic 104 can be a plane reflector for propagating the measuring beam 66 with only a change in direction or can be a spherical or aspherical reflector for also influencing the expansion of the measuring beam 66.

The directional optic 104 does block some of the return illumination 74 and 78, but the required interference still occurs, because with diffuse object and reference beams, the return illumination 74 and 78 is distributed throughout the aperture stop 83. The directional optic is preferably centered along the optical axis 106 and limited in area to maximize light throughput to the detector array 86. The imaging system aperture 83 is preferably itself sized to collect light originating from the on axis object points 94 and 96 of the object and reference surfaces 52 and 54 so that the entire object and reference surfaces 52 and 54 can still be imaged despite the central obscuration. Specularly reflected light from the same locations would be blocked by the directional optic 104.

Figure 5:
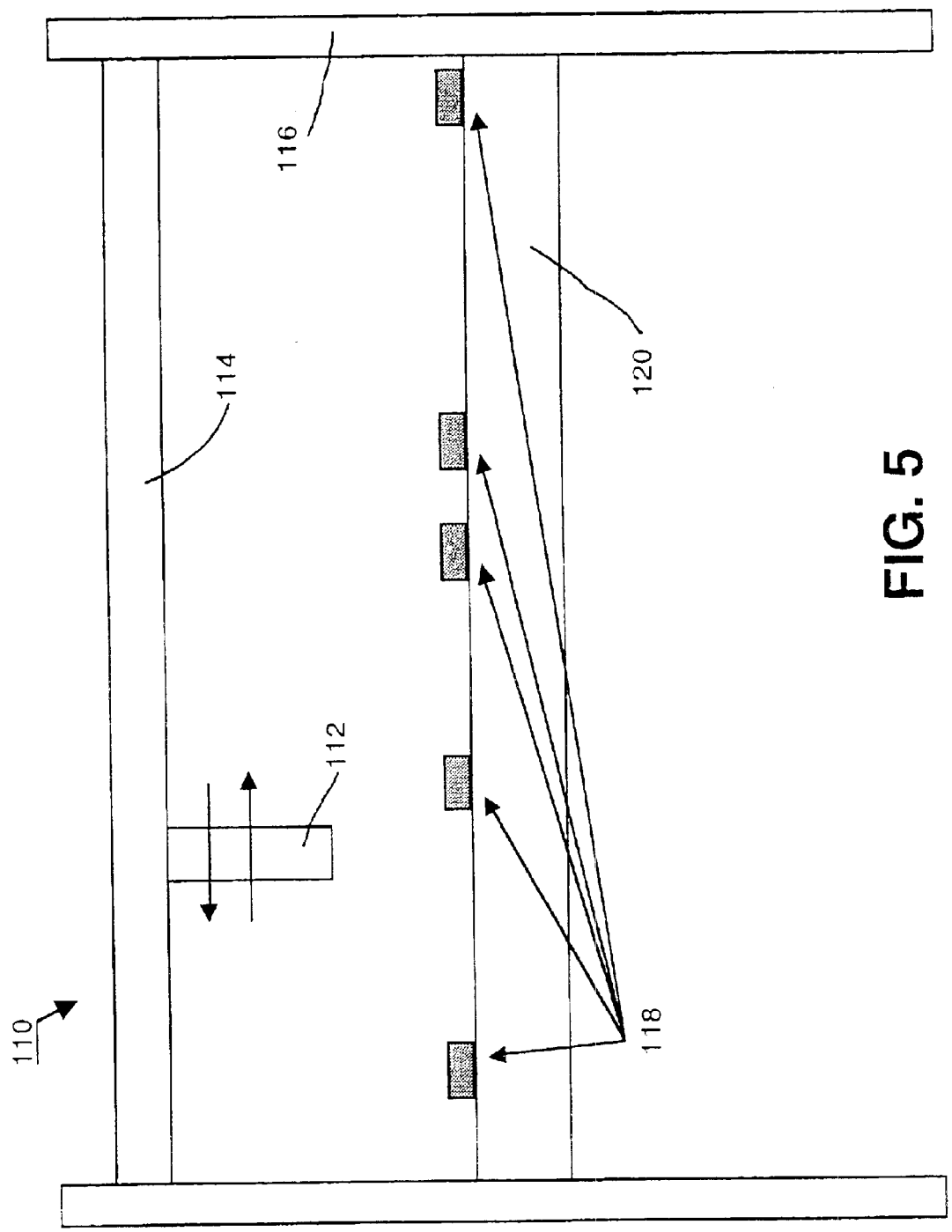
FIG. 5 is a front view of an apparatus using the compact interferometer of FIG. 3 or 4 for assembly line measurements.

The invention, as illustrated in FIGS. 3 and 4, can be used to image 3-D objects in a variety of conditions. For example, FIG. 5 illustrates a multi-stage interferometric measuring system 110 having a movable sensor 112 that incorporates the compact interferometer 50 or 100 of FIG. 3 or 4. The sensor 112 is mounted on a positioning stage 114, which is supported by a superstructure 116. The sensor positioning stage 114 allows the controlled movement of the sensor 112 in all directions so that the sensor 114 can view a plurality of inspection items 118 (test objects) in any desired position or orientation. The inspection items 118 can be located on the sensor-mounting superstructure 116 in positions that are fixed or relatively movable with respect to the superstructure 116 (e.g., on a conveyor belt). The items to inspect 76 can also be mounted on controllable positioning stages such as a translatable item stage 120 so that the inspection items 118 can be moved in directions to facilitate their imaging.

Figure 6C:
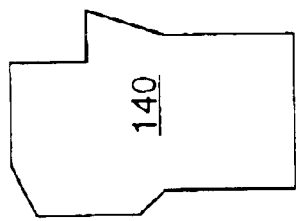
FIG. 6 shows in FIGS. 6A and 6B a rear view and a side view, respectively, of a handheld compact interferometer having internal structure shown in FIG. 3 or 4 for measuring an object shown in FIG. 6C.
Figure 6B:
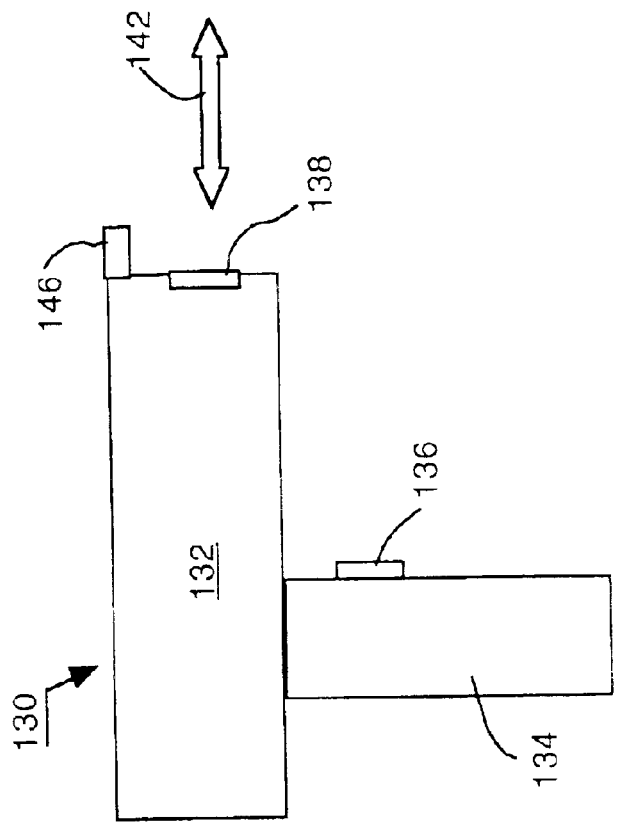
Figure 6A:
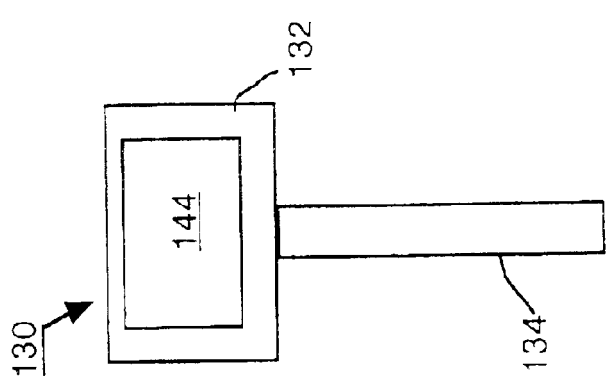

A portable handheld embodiment of the invention is illustrated by FIGS. 6A and 6B. Either of the interferometer systems 50 or 100 of FIGS. 3 and 4 can be mounted in a housing 132 to form a portable handheld imager 130 that includes a handle 134 and an actuator (or trigger) 136. The portable handheld imager 130 can be directed toward a test object 140 to be measured, which might include more than one test object. An object beam 142 illuminates the test object 140 and returned light from the test object 140 is received through a window or opening 138 in the housing, similar to a handheld barcode scanner. The actuator 136 initiates the data collection process. In one case, the operator is able to see an image of the test object 140 to be imaged on a visual display 144 to allow for precise targeting. The display 144, such as an LCD display (color or black/white) outputs images similar to a video camera from the detector array 86 (see also FIGS. 3 and 4) representative of the surface of the object where measurement is desired. The 3-D image information that results from the data collection in the detector array 86 can be transmitted to the computer system 90 running a program for data reduction and analysis. Since relative motion between the test object 140 and portable handheld imager 130 can occur, the portable handheld imager 130 is operative when the actuator 138 over a short time span compared to the movement time. A mounting post 146 or other stabilizing structure between the handheld imager 130 and the test object 140 can be used to limit relative motions during measurement. The portable handheld imager 130 can also include an auto focus mechanism (not shown) to allow added ease of imaging.

Variations and modifications in the herein described interferometer system process described herein will undoubtedly suggest themselves to those skilled in the art. For example, the invention is generally applicable to a range of interferometers types adaptable to the use of non-specular reference surfaces including other single-pass or double-pass interferometers nominally operated at normal or grazing incidence. As an alternative to laser tuning, frequency filters could be used in advance of the detector array to collect interferometric data at different frequencies. Accordingly, the foregoing description should be taken as illustrative and not in a limiting sense.

We claim:

1. A compactly configured interferometer system comprising:
    a detector that is illuminated by return illumination traveling along a return path from an object surface and from a reference surface;
    the reference surface being a non-specular reference surface;
    a source of illumination that provides an object beam and a reference beam that are incident on the object and reference surface, respectively; and
    an optical imaging system located along the return path for imaging an interference pattern onto the detector as a measure of differences between the object surface and the reference surface; and
    a beam insertion system for directing an expanding beam of illumination from the source along the return path in a direction opposite to the return illumination.

2. The interferometer system according to claim 1 wherein the beam insertion system includes a fiber optic having an end from which illumination from the source emanates.

3. The interferometer according to claim 1 wherein the beam insertion system includes a mirror located along an intermediate portion of the return path directing the expanding beam of illumination to the object and reference surfaces.

4. The interferometer system according to claim 3 wherein the beam insertion system also includes an objective that directs the illumination from the source to the mirror.

5. The interferometer system according to claim 1 further comprising a neutral density filter in the path of the incident and return illumination from the reference surface.

6. The interferometer system according to claim 5 wherein the filter has a surface tilted with respect to the reference surface.

7. The interferometer system according to claim 2 further comprising a beamsplitter located along the return path between the fiber optic end and the object and reference surfaces.

8. The interferometer system according to claim 3 further comprising a beamsplitter located along the return path between the mirror and the object and reference surfaces.

9. The interferometer system according to claim 1 further comprising an imaging system for imaging the return illumination and disposed so that the reference and object surfaces are conjugate to the detector.

10. The interferometer system according to claim 1 in which the beam insertion system is located adjacent to the imaging system.

11. The interferometer system according to claim 1 wherein the source of illumination is a laser tunable to N different frequencies, and a computer system is coupled to the laser for stepping the laser through the N frequencies and processing a succession of interference patterns imaged at the different frequencies onto the detector.

12. The interferometer system according to claim 1 wherein the interferometer system is sufficiently compact to be portable.

13. The interferometer system according to claim 1 further comprising a cavity containing the return path and at least a part of the beam insertion system, wherein illumination from the object and reference surfaces interferes to form an interference pattern, and beam insertion system is disposed in relation to the cavity for introducing the illumination from the source.

14. A method for interferometrically measuring an object surface in comparison with a diffuse reference surface comprising the steps of:
    providing an illumination beam from a point light source along a first path;
    separating the illumination beam into a reference beam and an object beam;
    illuminating the object surface with the object beam;
    illuminating the diffuse reference surface with the reference beam;

combining returned light from the illuminated object surface and returned light from the illuminated diffuse reference surface along a second path to form interference patterns reflecting differences between the surfaces; and focusing the returned light onto a detector to relate the interference patterns to overlapping images of the object surface and the diffuse reference surface, wherein the first and second paths overlap and the illumination beam travels along the first path in a direction opposite to returned light along the second path.

15. The method according to claim 14 wherein the illumination beam is tuned to different wavelengths to form the interference patterns at the different wavelengths.

16. The method according to claim 15 comprising the step of processing the interference patterns at the different wavelengths to provide a multi-dimensional image of the object surface.

17. The method according to claim 14 wherein the returned light from one of the object surface and the reference surface passes through a neutral density filter.

18. The method according to claim 14 wherein the returned light is focused onto the detector through an aperture stop that is smaller in dimension than a transverse area of the object surface that is imaged onto the detector.

19. An interferometer system for measuring the profile of an object surface comprising:

a source for providing an illumination beam along a first path;

a reference member having a diffuse reflective surface;

beam directional optics that splits the illumination beam into an object beam to illuminate the object surface and a reference beam to illuminate the diffuse reflective surface, and that combines returned light from the illuminated object surface and the illuminated diffuse reflective surface along a second path to form interference patterns representing differences between the object surface and the diffuse reflective surface; and imaging optics for focusing the interference patterns onto a detector in the form of overlapping images of the object surface and the diffuse reflective surface, wherein the first and second paths overlap and the illumination beam travels along the first path in a direction opposite to the returned light along the second path.

20. The interferometer system according to claim 19 further comprising a housing that contains the reference member, the beam directional optics, and the imaging optics, and that includes a window through which passes the object beam to the object surface and the returned light from the object surface.

21. The interferometer system according to claim 20 wherein the housing is capable of being handheld.

22. The interferometer system according to claim 20 wherein the housing is capable of being installed as a movable sensor on a coordinate measuring machine.

* * * * *